United States Patent
Herajarvi et al.

(10) Patent No.: US 7,120,418 B2
(45) Date of Patent: Oct. 10, 2006

(54) MESSAGE COMMUNICATION CHARGING

(75) Inventors: Juha Herajarvi, Lempaala (FI); Tarmo Lehto, Tampere (FI); Torben Broedsgaard, Copenhagen V (DK); Leif Pedersen, Copenhagen SV (DK)

(73) Assignee: Nokia Networks Oy, Espoo (FI)

( * ) Notice: Subject to any disclaimer, the term of this patent is extended or adjusted under 35 U.S.C. 154(b) by 631 days.

(21) Appl. No.: 09/850,036

(22) Filed: May 8, 2001

(65) Prior Publication Data

US 2001/0029174 A1    Oct. 11, 2001

Related U.S. Application Data

(63) Continuation of application No. PCT/FI99/00935, filed on Nov. 10, 1999.

(30) Foreign Application Priority Data

Nov. 10, 1998    (FI) ........................................ 982440

(51) Int. Cl.
*H04M 11/00* (2006.01)
*H04Q 7/20* (2006.01)

(52) U.S. Cl. ................. 455/406; 455/407; 455/408; 455/433; 455/466

(58) Field of Classification Search ................ 455/406, 455/407, 408, 433, 466; 379/111, 112.01, 379/114.01, 114.15, 117.17, 114.2, 126, 127.1, 379/127.04, 144.01
See application file for complete search history.

(56) References Cited

U.S. PATENT DOCUMENTS

| | | | | |
|---|---|---|---|---|
| 5,903,726 | A | * | 5/1999 | Donovan et al. ............ 709/206 |
| 6,044,259 | A | * | 3/2000 | Hentila et al. .............. 455/406 |
| 6,373,933 | B1 | * | 4/2002 | Sarkki et al. ................ 379/126 |
| 6,473,622 | B1 | * | 10/2002 | Meuronen .................... 455/466 |

FOREIGN PATENT DOCUMENTS

| | | |
|---|---|---|
| EP | 753 957 | 1/1997 |
| EP | 812 120 | 12/1997 |
| FI | 973912 | 4/1999 |
| WO | WO 96/06508 | 2/1996 |
| WO | WO 98/28920 | 7/1998 |
| WO | WO 98/56202 | 12/1998 |

* cited by examiner

*Primary Examiner*—Matthew Anderson
*Assistant Examiner*—Yuwen Pan
(74) *Attorney, Agent, or Firm*—Pillsbury Winthrop Shaw Pittman LLP

(57) ABSTRACT

A method and a system for charging for message communication, e.g. short messages, in intelligent network applications and especially for charging for message communication by a prepaid subscriber. For charging an intelligent network subscriber for message communication, the message communication bills of the intelligent network subscribers are retrieved from the data collected for message communication charging and the bills are used to update the charging data of the intelligent network. This action is preferably performed periodically.

14 Claims, 4 Drawing Sheets

MESSAGE COMMUNICATION CHARGING

This application is a Continuation of International Application PCT/FI99/00935 filed Nov. 10, 1999 which designated the U.S. and that International Application was published under PCT Article 21(2) in English.

BACKGROUND OF THE INVENTION

The invention relates to charging for message communication, e.g. short messages, in intelligent network applications and especially to charging for message communication by a prepaid subscriber. A prepaid subscriber refers to a subscriber using prepaid subscription, i.e. a subscriber who has paid in advance.

A large number of different services can be offered to a subscriber of a telecommunication network—a wire network or a mobile network, for instance—by means of an intelligent network (IN). Examples of the services are a virtual private network (VPN) service, which enables the use of private numbers, and a personal number service, in which the intelligent network reroutes calls made to the personal number in a manner controlled by the subscriber.

An example of message communication in mobile networks is the short message service SMS. It differs from speech and data services in that to send a short message, a connection from the sender to the receiver need not be established, since short messages are transmitted through signalling. For instance, in the pan-European GSM network (Global System for Mobile Communication), short messages can be received and sent even during an ongoing call, since short messages are transmitted on control channels.

Charging an intelligent network subscriber for intelligent network services is usually done when the subscriber makes a call. In other words, establishing a connection triggers the charging. On the other hand, an intelligent network subscriber can also use chargeable short message services, for instance send short messages. Some systems also charge for receiving short messages. A connection is, however, not established for a short message service, in which case the intelligent network charging is not triggered, because prior art switching centres supporting intelligent network services do not support charging an intelligent network subscriber for short messages. The matter becomes especially problematic when prepaid connection time is used, because sending short messages, for instance, does not reduce the amount of money available, only actual calls do.

BRIEF DESCRIPTION OF THE INVENTION

It is thus an object of the invention to develop a method and an apparatus implementing the method so as to solve the above-mentioned problems. The object of the invention is achieved by a method and a system characterized by what is disclosed in the independent claims. Preferred embodiments of the invention are set forth in the dependent claims.

The invention is based on finding the message communication bills, e.g. short messages, of intelligent network subscribers from the data collected for message communication charging, and the charging information of the intelligent network is updated with them. This is preferably done periodically.

Message communication refers here to any message sent from or to a mobile station without setting up an end-to-end connection. Examples of message communication are short messages and USSD (Unstructured Supplementary Service Data) messages.

The method and system of the invention provide the advantage that message communication, e.g. short messages, can be charged and/or the amount of money available to a prepaid subscriber can be reduced through the intelligent network, even though the subscriber did not make a single call. Also, when a prepaid subscriber makes a call, the amount of money available is known more exactly, because the amount of money used for message communication, e.g. short messages, is deducted from the amount of money available.

In connection with this invention, a subscriber who has paid in advance is also called a subscriber using prepaid connection time and a prepaid subscriber.

In one preferred embodiment of the invention, a check is made to see if a prepaid subscriber has already used up the entire amount of money available, and if yes, the use of chargeable message communication services, e.g. short message services, is blocked. This provides the advantage that service provider's losses can be minimized.

In one preferred embodiment of the invention, functions are performed at certain intervals. This provides the advantage that the network load and the possible losses caused by message communication, e.g. short messages, can be optimized. It is well known that service providers do not charge very much for message communication, e.g. for transmitting short messages, and, thus, updating the data at one-hour intervals, for instance, is enough to prevent very large losses.

BRIEF DESCRIPTION OF THE DRAWINGS

In the following, the invention will be described in greater detail in connection with preferred embodiments and with reference to the accompanying drawings, in which.

DETAILED DESCRIPTION OF THE INVENTION

The present invention can be applied to any data transmission system in which a subscriber, who has provisioned an intelligent network service, can also use chargeable message communication services. In the following, the invention is described using short message services as an example of the message communication services, without, however, limiting the invention to these particular services. In addition, in the following, the invention is described using as an example a combination of the pan-European GSM system (Global System for Mobile communication) and an intelligent network without, however, limiting the invention to any specific system. An intelligent network can, for instance, be combined to the general packet radio service GPRS, which is a new service for the GSM system and one of the issues standardized by ETSI (European Telecommunication Standard Institute) in the GSM phase 2+. The GPRS service supports message communication services and enables packet data transmission between mobile data terminals and external data networks, while the GSM network functions as an access network. An intelligent network can also be combined to third-generation mobile systems under development, such as UMTS (Universal Mobile Telecommunications System) and IMT-2000 (International Mobile Telecommunications 2000). The TETRA (Terrestrial Trunked Radio) network also supports message communication, e.g. short message transmission. The specifications of mobile systems and the intelligent network evolve rapidly. This evolution may require extra changes to the invention. Therefore, all terms and expressions should be interpreted widely, and they are intended to describe and not restrict the invention. It is the function that is essential for the invention and not in which network element or apparatus it is executed.

Figure 1:
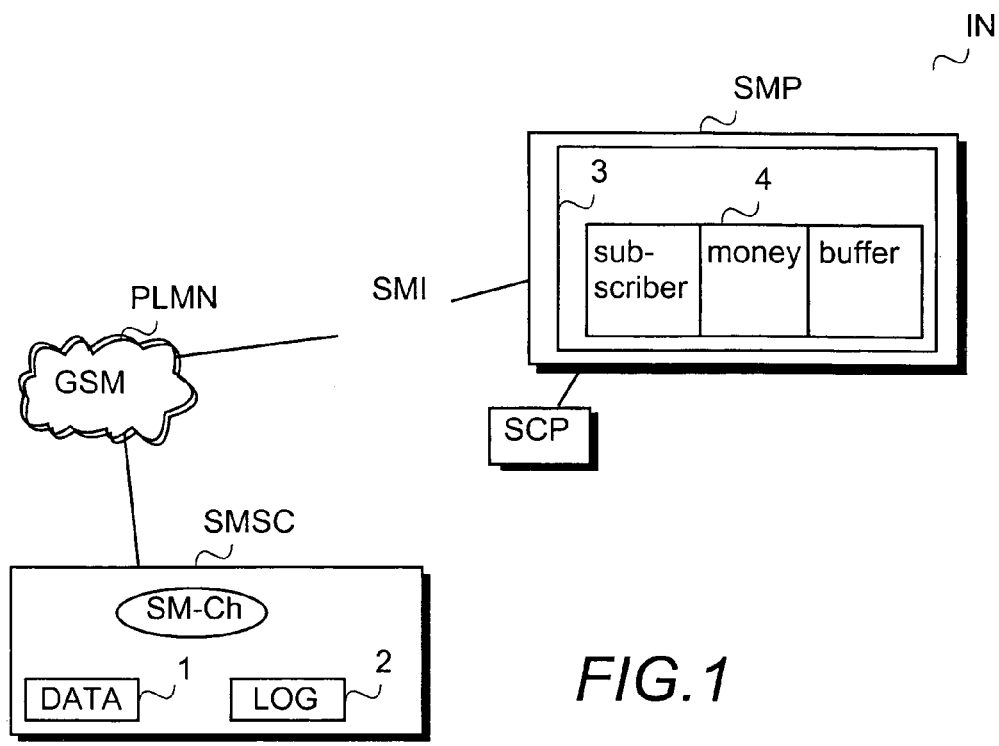
FIG. 1 illustrates a system of a first preferred embodiment of the invention.

FIG. 1 shows the structure of a telecommunication system of a first preferred embodiment of the invention on a general level. A more detailed network structure bears no essential significance with regard to the invention. A telecommunication system implementing the functionality of the present invention comprises not only means for implementing services according to prior art, but also means for reading message communication charging files, i.e. data files, and means for moving the charging data on a per subscriber basis to the charging mechanism of the intelligent network. In addition, the system may comprise means for updating the account data of prepaid subscribers with message communication bills. Further, the system may comprise means, with which the subscribers who have already used up their prepayment are prevented from utilizing message communication services chargeable to the subscriber.

It is assumed in the preferred embodiment of the invention shown in FIG. 1 that the telecommunication network PLMN transmitting short messages is a network based on the GSM system and its most essential part in the first preferred embodiment of the invention is a home location register HLR. The home location register HLR is a subscriber database which includes information, for instance, on whether the subscriber can send short messages or use some other message communication. For a more detailed description of the GSM system, see "The GSM System for Mobile Communications", M. Mouly and M. Pautet, Palaiseau, France, 1992, ISBN:2-9507190-07-7.

A short message service centre SMSC is not an actual network element of the GSM system, but connecting it to the GSM system is known to persons skilled in the art. The short message service centre SMSC is a unit which forwards short messages and stores and retransmits short messages which have not been delivered. All short messages pass through a short message service centre SMSC. In a first preferred embodiment of the invention, the short message service centre collects data for short message charging. Generating the charging data, i.e. the data files, is described in greater detail in FIG. 2. In the first preferred embodiment of the invention, the charging activity of short messages SM-Ch can be located in the short message service centre, for instance. It can also be located in another network element in the PLMN or in the intelligent network, for instance in an intelligent network service control point. The charging activity of short messages is described in greater detail in FIGS. 3 and 4. In the first preferred embodiment of the invention, the short message service centre also comprises two directories. Directory 1 (data) contains the data files described in FIG. 2 and directory 2 (log) contains the log files described in FIG. 3 and the moved data files. These directories can also be located in other network elements and they need not be in the same network element, nor do they need to be in the same network element as the SM-Ch. Directory 1 can, for instance, be located in the transit exchange of the PLMN and directory 2 in the intelligent network service management point SMP. The basic idea of the invention is that the message communication service centre, e.g. short message service centre, does not have a direct connection to the intelligent network, but the connection is established through the PLMN. It is also possible to establish the connection from the message communication service centre, e.g. short message service centre, to the intelligent network.

It should be further emphasized that the location, where the message communication charging function, e.g. the short message charging function, directory 1 and directory 2 are located, bears no significance with regard to the invention. They can also all be located in different places.

Usually, a mediation device MD (not shown in FIG. 1) is used to connect a customer care and billing system and the HLR to another system.

In the first preferred embodiment of the invention, the most essential parts of the intelligent network IN are the intelligent network service control point SCP comprising the intelligent network control function, the intelligent network service management point SMP comprising the intelligent network service management function, and the service management interface SMI. The service management interface is an interface used in handling the data in the intelligent network databases. In the first preferred embodiment of the invention, a database 3 containing a charging record 4 of the subscribers is located in the intelligent network service management point. The charging record contains an identifier (subscriber) for each subscriber, the amount of money (money) loaded in advance for the subscriber, and buffer data (buffer). In the first preferred embodiment, it will be assumed that the IN and, more precisely, the SCP is responsible for keeping track of the available credit of the prepaid subscriber, but this bears no essential significance to the invention.

In the first preferred embodiment of the invention, the subscriber identifier is the telephone number. Other identifiers can also be used. The buffer data comprises data which has not yet been updated to the preloaded amount of money. Buffer data used in prior art is, for instance, money loaded by the subscriber after the previous update. Buffer data of the invention comprises message communication bills, which in the first preferred embodiment are short message bills. In the first preferred embodiment of the invention, the loaded money is entered as positive and the bills as negative figures to the buffer data. This way, separate addition and subtraction buffers are not needed. The charging record 4 is located in the SMP, because its actual updating there does not require changes to prior art. The charging record can also be located in another network element.

Figure 5:
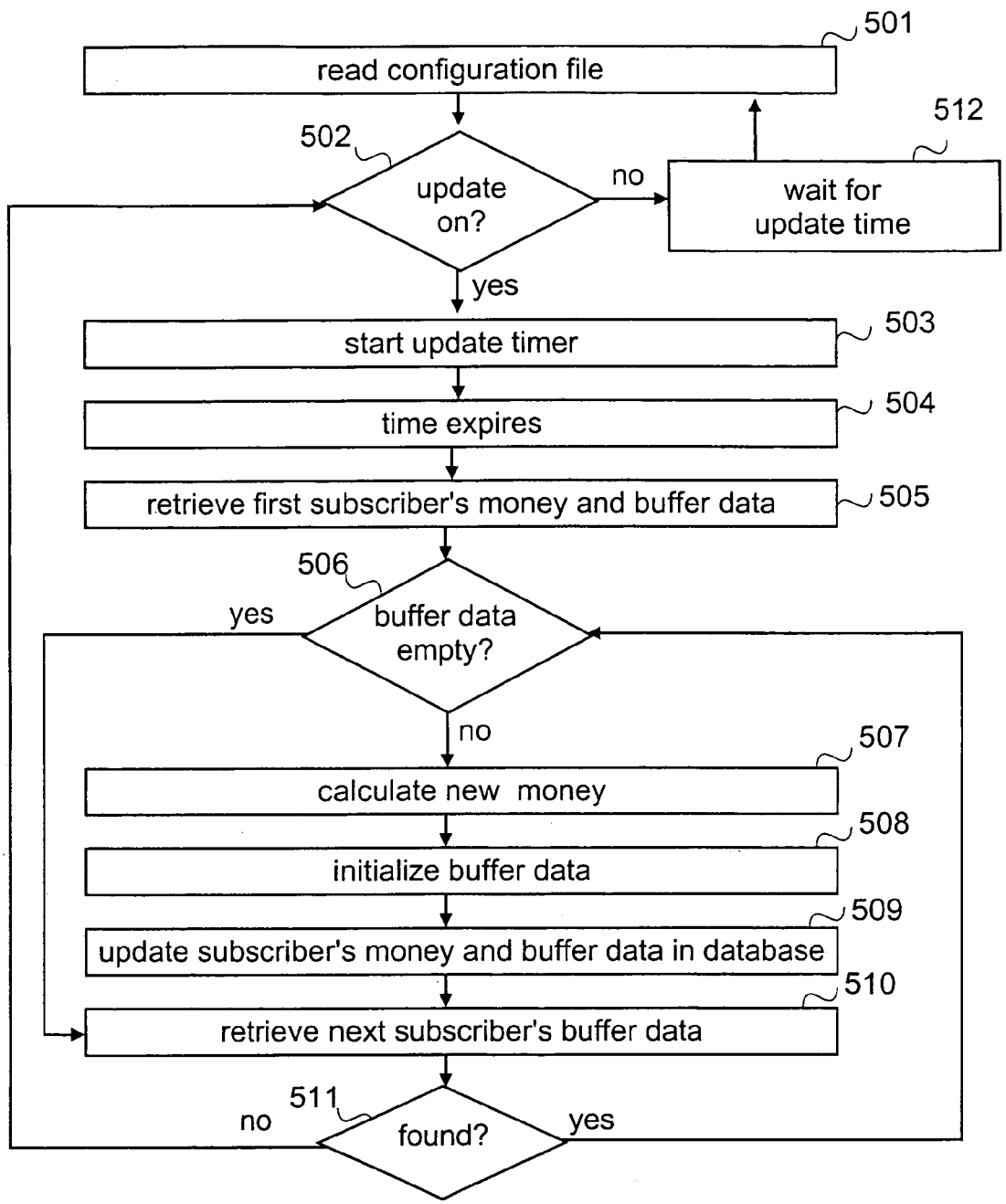

In the first preferred embodiment of the invention, an intelligent network service logic, described in FIG. 5, is inserted into the intelligent network control point. At the same time, the parameters described in FIG. 5 are inserted to the control point configuration file for controlling the operation of the service logic. The purpose of the service logic is to initiate an update procedure, i.e. mechanism, of charging data according to prior art. The update procedure is initiated at a predefined time. The first preferred embodiment makes sure that that the update procedure is also initiated periodically and performed for each prepaid subscriber.

Figure 2:
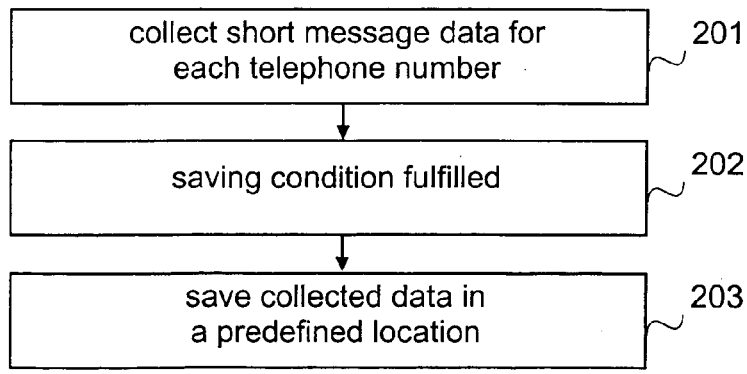
FIGS. 2, 3, 4, and 5 show flow charts illustrating the functions of the first preferred embodiment of the invention.

FIG. 2 shows the charging operation performed in the short message service centre of the first preferred embodiment of the invention. Same kind of functionality may be applied to all other message communication service centres. The short message service centre continuously repeats the steps of FIG. 2. In step 201, short message charging data is collected for each telephone number, until, in step 202, it is detected that the saving condition of the collected data is fulfilled. In the first preferred embodiment, the saving condition is the lapse of a certain period of time from the previous saving. In other embodiments, other saving conditions can be used, such as the collection of a certain amount of data. After this, in step 203, the collected charging data is saved in a predefined location. The data file is given an explicit name. The name can, for instance, be the time when the file is saved at a precision of a second.

In the first preferred embodiment, the charging data is collected in the required data file format. In the embodiments, in which this is not done, a data file is formed of the collected data when it is saved. In the first preferred embodiment, the data file contains the short message bills accumulated during the collection period for each telephone number, since the telephone number is used to identify each subscriber. Thus, in the first preferred embodiment, each telephone number is normally presented once in the data file. For instance, if two short messages, FIM 1 each, have been sent from the number 123 during the collection period, the data file contains a short message bill of FIM 2 for the number 123. In another embodiment, the data file may contain two separate short message bill items for the number 123.

If the charging data of short messages is collected in another network element, the operation described above can be performed there. The essential thing is that the data file is formed according to predefined conditions and it is saved in a predefined location.

Figure 3:
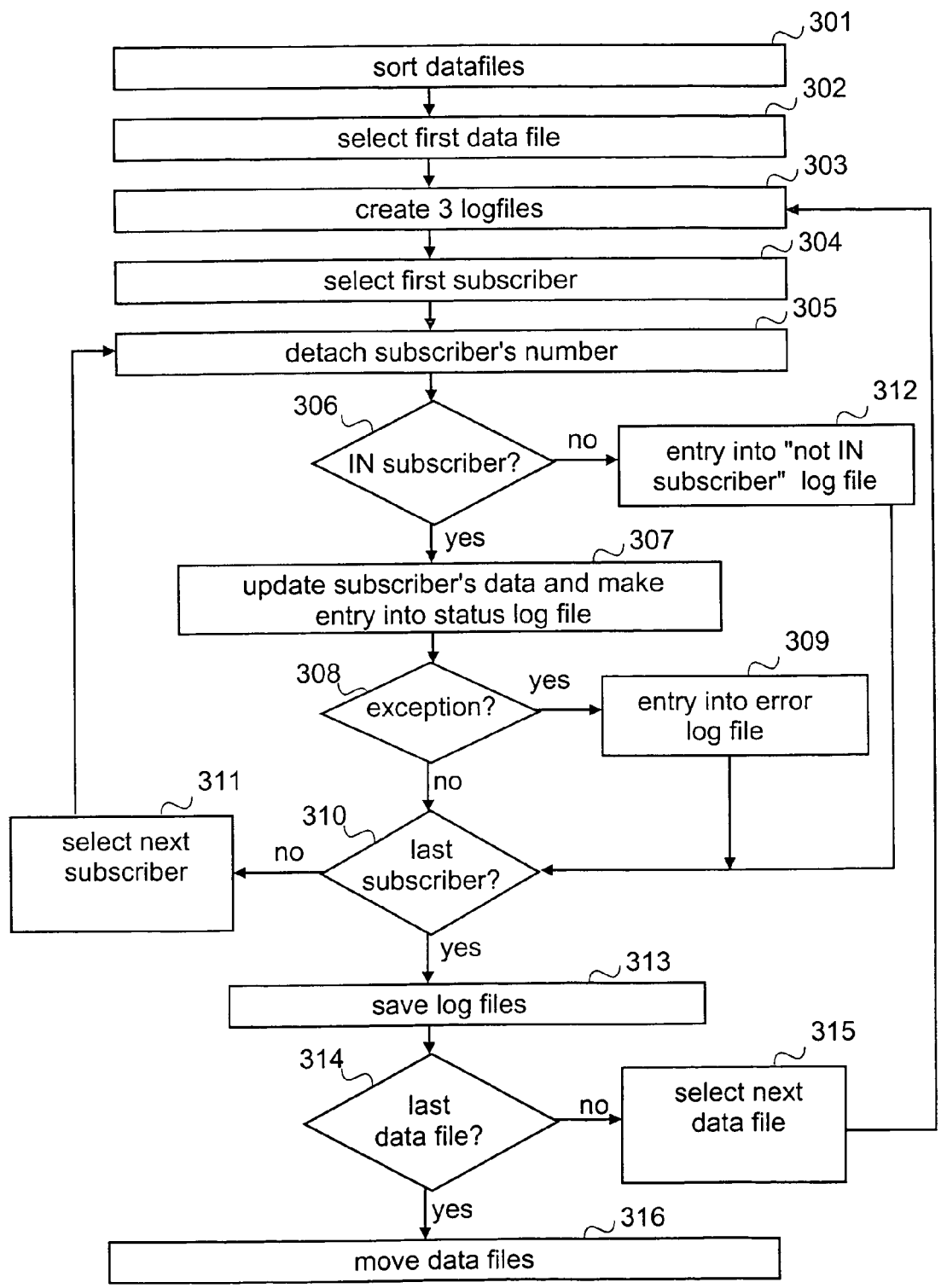

FIG. 3 shows short message charging of the first preferred embodiment. In the first preferred embodiment, the charging operation is initiated at predefined intervals, when the charging function is activated. Only one charging function can be active in the first preferred embodiment. This ensures that same charges will not be deducted twice. The example in FIG. 3 starts from a situation where the charging function has been activated. When the charging function is activated, it preferably receives information on where the data files are and where the log files will be created. In another embodiment, the charging function can also be adapted to ask the creator of the data files, for instance the short message service centre, where the data files are.

As a result of the charging function, three log files—a status log file, a not-an-intelligent-network-subscriber log file and an error log file—are created for each data file in the first preferred embodiment. These log files are saved in a predefined location. In addition, the actual amount of money available to the subscriber is known as a result of the charging function.

The example in FIG. 3 starts from a situation where the charging function has been activated. In step 301, the data files are sorted so that they can be processed in the required order. The sorting criterion can be the name of the data file, for instance. When the data files have been sorted, the first data file is selected in step 302, and in step 303, the three log files mentioned above are created for it in the predefined location. The names of the log files are preferably generated from the name of the data file by adding to the name of the data file the type of the log file, for instance. The location of the log files is preferably not the same as that of the data files. They should at least be in a different directory.

Next, in step 304, the first subscriber of the data file is selected, and in step 305, the telephone number of the subscriber is detached from the data, and in step 306, the number is used to check whether the subscriber is an intelligent network subscriber. The subscriber is an intelligent network subscriber, if his or her data is in the SMP. In other words, in step 305, a check is made to see if the number of the subscriber is also in the SMP. If the subscriber is an intelligent network subscriber, his or her data is updated and an entry is made into the status log file in step 307. The operation of step 307 in the first preferred embodiment is described in greater detail in FIG. 4.

In step 308, a check is made to see if this is an exception condition. If yes, an entry is made into the error log file in step 309. Step 309 can also be reached directly from other steps always when an exception condition is detected, because all exception conditions occurring during data file processing are entered into the error log file. The fact that the subscriber is not in the subscriber database does not constitute an exception condition in the first preferred embodiment. If the error log file cannot for some reason be created in step 303 or an entry cannot be made into it in step 309, the error text is entered into an error stream, and the next data file is selected for processing.

The operation continues from step 310, after the entry has been made in step 309 or if it is detected in step 308 that this is not an exception condition. In step 310, a check is made to see if the subscriber being processed is the last subscriber in the data file. If not, in step 311, the next subscriber is selected, after which the operation continues from step 305 where the telephone number of the subscriber is detached.

If it is detected in step 306 that the subscriber is not an intelligent network subscriber, an entry, for instance the number of the subscriber, is made in step 312 into the not-an-intelligent-network-subscriber log file. After this, the operation continues from step 310 where a check is made to see if the subscriber being processed is the last subscriber in the data file.

If it is detected in step 310 that the subscriber is the last subscriber in the data file, the log files are saved with their entries in step 313. If there are no entries in the log file, an empty log file is saved in the first preferred embodiment.

When the log files have been saved, a check is made in step 314 to see if the processed data file is the last data file in the data file directory. If there are more data files, the next one is selected in step 315 and its processing is started in step 303 by creating 3 log files for it and continuing on from there as described above. If the data file is the last data file, in step 316, the processed data files are moved to where the log files were saved. This ensures that charging records which have already been processed will not be processed again, but the data is available for possible complaints and for charging the subscribers who are not intelligent network subscribers.

Figure 4:
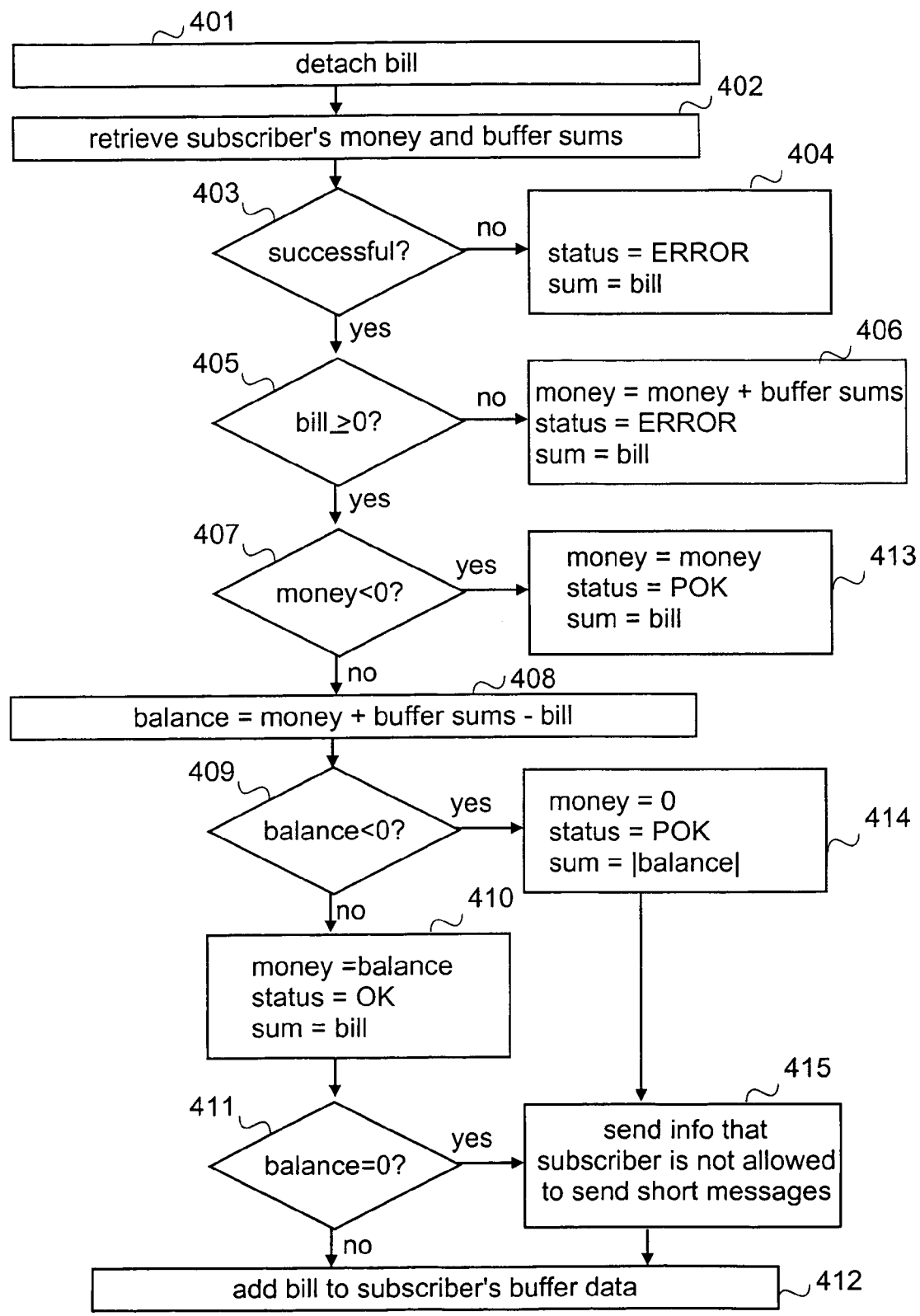

FIG. 4 describes updating the account data of an intelligent network subscriber and making entries in the status log file according to the first preferred embodiment. In other words, FIG. 4 shows step 307 of FIG. 3 in greater detail. In the first preferred embodiment, the status log file contains the amount of money available to the subscriber after an update, a sum and a status for each subscriber to be charged identified by the subscriber number. Other subscriber-specific data can also be entered into the status log file. The amount of money available to the subscriber is referred to as 'money' in the figures.

In step 401, the bill accumulated from short messages for the subscriber is detached from the data file. After this, the amount of money currently available to the subscriber is retrieved from the SMP database as well as possible sums in the buffers. If the data retrieval fails (step 403), for instance because the subscriber data was not found in the database or because the short message charging service has not been activated for the subscriber, in step 404, ERROR is entered into the status log file as the status for the subscriber's number and the bill detached in step 401 as the sum. The amount of money available to the subscriber after an update is in the first preferred embodiment set to zero. In some other embodiments, this figure can be any predefined figure.

If the data retrieval succeeds (step 403), a check is made in step 405 that the bill is positive, i.e. at least zero. This ensures that the amount of money available to the subscriber is not, by accident, increased due to an error occurred during data creation, for instance. If the bill is not positive, the operation continues from step 406 in which the amount of money available to the subscriber after an update in the status log file is set to the sum obtained by adding up the amount of money available and the buffer sums retrieved in step 402, the status is set to ERROR, and the sum is set to the bill detached in step 401. (In the buffer sums, the bills are marked negative and the loaded amounts of money positive.)

If the bill is positive (step 405), the operation continues from step 407 in which a check is made to see if the amount of money available to the subscriber retrieved from the database is negative, i.e. smaller than zero. A negative amount of money can, for instance, be used to form a charging record (i.e. an IN ticket) in a normal charging system. In other words, a negative amount of money is used to distinguish prepaid subscribers from other subscribers in the example of FIG. 4. Prepaid subscribers can also be distinguished from other subscribers by another method than by using the amount of money available, or another figure than zero can be used as the comparison criterion. If the amount of money available is not negative, the balance of the subscriber is calculated in step 408 by adding up the amount of money available and the buffer sums retrieved in step 402 together and subtracting the bill from the sum thus obtained. In step 409, a check is made to see if the balance is smaller than a predefined limit value. In the first preferred embodiment, the limit value is zero. If the balance is not smaller than zero, in step 410, the balance is set as the amount of money available to the subscriber after an update in the status log file, the status is set to OK and the sum is set to the bill detached in step 401. After this, in step 411, a check is made to see if the balance fulfils the pre-set condition. In the first preferred embodiment, the condition is, whether the balance equals the pre-set limit value zero. This limit value need not be the same as the limit value in step 409. If the balance is not zero, the subscriber still has money to use and the operation continues from step 412, in which the bill is added to the buffer data of the subscriber in the SMP database. Adding the bill to the buffer data is preferably done through the service management interface SMI. In the first preferred embodiment, the bill is added to the buffers as a negative sum, because it reduces the amount of money available to the subscriber.

If it is detected in step 407 that the amount of money available is negative, the operation continues from step 413. In step 413, the subscriber's credit is not entered in the log file, the status is set to POK and the sum is set to the bill detached in step 401.

If it is detected in step 409 that the balance is smaller than zero (i.e. smaller than the predefined limit value), in step 414, the status in the status log file is set to POK and the sum at the absolute value of the balance. After this, in step 415, information is sent that the subscriber is not allowed to send short messages. This prevents further overdrafts of subscriber accounts. A home location register refers here to the network elements, from which the subscriber data related to short message services are checked in connection with a chargeable short message service. In the first preferred embodiment, the short message service is deactivated for the subscriber by means of the MD in step 415, and the subscriber is added to the list of deactivated subscribers. In the first preferred embodiment, a separate deactivation program continuously monitors the deactivated subscribers and, by means of the MD, activates the short message service of subscribers who have more money on their account than debt. The subscriber in question is then also removed from the deactivation list. When the information has been sent (step 415), the operation continues from step 412, where the bill is added to the buffer data of the subscriber. This ensures that the overdraft can be charged later from new prepaid connection time. In another embodiment, the information can be sent to the HLR at another stage, or data can first be collected on subscribers who are no longer allowed to send short messages, and then the collected data is sent to the HLR.

If it is detected in step 411 that the balance is according to the predefined condition, which is zero in this example, the subscriber is, in the first preferred embodiment, prevented from overdrawing his or her account by transmitting information blocking (i.e. barring) the subscriber from sending short messages in step 415 and by continuing on from there as described above.

The status of the subscriber makes it possible to determine, how the update of the buffer data has succeeded. OK means that the update was successful. POK means that the subscriber could not be charged now, but it will be possible later. The subscribers to be charged are distinguished from those paying in advance but who have overdrawn their account. The status data can also be used to monitor losses, for instance. In the first preferred embodiment of the invention, the use of chargeable short message services is blocked to a prepaid subscriber immediately, when the amount of money available becomes zero or less. Correspondingly, the value of all unpaid short messages can be obtained from the status log file by adding up the sums of all subscribers whose status is POK.

FIG. 5 describes a service logic of the first preferred embodiment, which manages the charging of short messages, located in the service control point of the intelligent network. The service logic makes it possible to ensure that short message charging can continue undisturbed even though the subscriber only sends short messages without making any calls. At the same time, the existing mechanism, which charges the money and updates the buffer data, used by the SMP database is utilized. In addition, the service logic makes it possible to ensure that the calls made and short message services used by the subscriber both reduce the amount of money available to the user. The service logic can be implemented by adding two new network-level parameters, for instance, to the service control point configuration file, of which parameters one defines, whether the buffer update function is on, and the other defines the value of the update timer. In the first preferred embodiment, the configuration file is read at intervals specified by the update timer value.

In FIG. 5, the starting point is step 501, in which the configuration file is read, and next, in step 502, a check is made to see if the buffer update function is on. If the buffer update is on, in step 503, the internal update timer of the service control point is started and set to the value of the update timer in the configuration file to achieve the update interval required by the operator. If the update timer is already on, it is not restarted. When the time expires in step 504, the amount of money available and the buffer data of the first subscriber is retrieved from the charging record of the SMP database in step 505. After this, in step 506, a check is made to see if updating is required. In other words, in step 506, a check is made to see if the buffers are empty. If there is buffer data, updating is required. In step 507, the new available amount of money is then calculated by adding up the retrieved amount of money and the buffer data values, and the buffer data is initialized in step 508. After this, the subscriber's account data, i.e. the amount of money available and the buffer data, is updated in the charging record of the SMP database in step 509. After the update, in step 510, the amount of money available and buffer data of the next subscriber in the charging record of the SMP database is retrieved. If they are found (step 511), the operation continues from step 506 as described above.

If the data is not found (step 511), the account data of all intelligent network subscribers have been updated. After this, the operation continues from step 502, in which a check is made to see if updating is on.

If it is detected in step 506 that the buffers are empty, this means that the subscriber has not sent any short messages or loaded money on his or her card. In this case, the subscriber data need not be updated and the operation preferably moves from step 506 to step 510 to retrieve the data of the next subscriber.

If it is detected in step 502 that updating is not on, in step 512, the system waits for the time specified in the update timer. When the time has elapsed, the configuration file is read in step 501 and the operation continues as described above.

In embodiments, in which the changes in the buffer data related to the SMP charging produce an internal SMP update routine, a service logic program located in the SCP is not needed. In some embodiments, either the SMP or the charging function described in FIG. 3 can ask the SCP for an update of all subscriber data or send, for instance in step 412, a request to update the data of a single subscriber, in which case no changes are required to the configuration files. However, the first preferred embodiment provides the advantage that changes to network elements and to the operation between network elements have been minimized.

Figure 6:
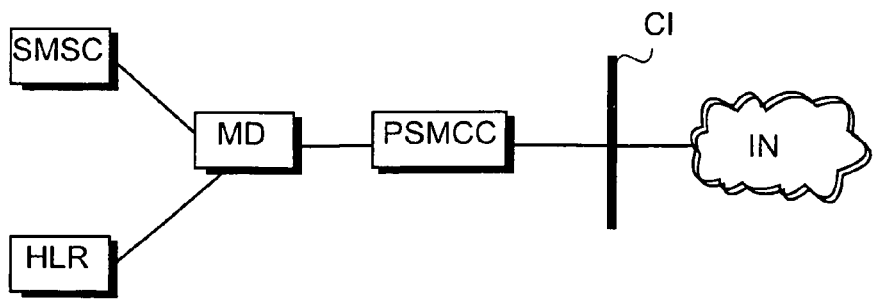
FIG. 6 illustrates a system of a second preferred embodiment of the invention.

FIG. 6 shows the structure of a telecommunication system of a second preferred embodiment of the invention on a general level. A more detailed network structure bears no essential significance to the invention. In the second preferred embodiment, there is no direct connection between the charging activity and the service control point, and the initiation of the update procedure is not done in the service control point.

In the second preferred embodiment, the charging activity of short messages SM-Ch (not shown in FIG. 6) is located in a separate network element called Prepaid Short Message service Charging Centre PSMCC to which a customer care and billing system (not shown in FIG. 6) may be connected. A PSMCC receives prepaid charging data records generated in the SMSC through a Mediation Device MD in the second preferred embodiment. In some other embodiments, the PSMCC may receive charging data records directly from the SMSC. The PSMCC stores the charging data records and rates and accumulates them. In other words, account statements and statistics on sent short messages are collected and presented by the PSMCC in the second preferred embodiment. The PSMCC increases the counter for Short Messages sent by the prepaid user during the collection period. The PSMCC decides in the second preferred embodiment of the invention e.g. if the prepaid users can be charged and what the rate is (the amount that the prepaid user can be charged).

In other words, it is the PSMCC which decides whether or not it is a date, when the short message service is free of charge, for example.

The PSMCC is connected to the IN system through a general charging interface CI in the second preferred embodiment. The PSMCC sends a charging request through the charging interface CI to the IN system by calling the general charging interface to the IN system carrying a price based on an accumulated number of rated charging data in the second preferred embodiment. The charging interface CI performs the actual charging of the prepaid accounts. In other words, the PSMCC initiates the update procedure by sending a charging request to the SMP through the charging interface CI and the money is deducted from the prepaid users account as described above. The PSMCC may initiate the update procedure even on a subscriber basis e.g. when a predetermined time has elapsed or the number of short messages to be charged exceeds a limit.

The interface CI preferably provides a buffering system so that the SMP database does not need a buffer and still is not overloaded by the charging centre PSMCC in the second preferred embodiment. Through the interface, the PSMCC will receive information about state changes in the expiry service and the low credit event. The expiry service is explained below. Further more the IN system will also send information through the interface if a subscription has been created or deleted. The interface CI will give the PSMCC the possibility to request information about the credit on an account and the possibility to charge an account.

In the second preferred embodiment, when the IN system detects that a subscriber has no more "active" credit, the PSMCC will be notified through the charging interface CI. This will trigger a "block SMS" command for the HLR in the PSMCC. This is done either directly or through a mediation device. The rules for blocking (barring) for originating or terminating short message service, for instance, may be implemented in the PSMCC. When the subscriber later performs a recharge and becomes active again, the IN system may notify the PSMCC and the "unblock SMS" command can be sent to the HLR through the Mediation Device. The PSMCC may subscribe to a number of events from the charging interface CI. The PSMCC also receives information on create/delete subscription commands, which the PSMCC uses to create and delete subscriptions in its internal database in the second preferred embodiment.

The charges which cannot be performed on the accounts due to lack of credit will be stored in lost credit accounts in the IN system in the second preferred embodiment. Charging of the subscriber's account will then be attempted preferably when the subscriber performs a recharge.

In the second preferred embodiment, the Mediation Device MD between the SMSC and the PSMCC will filter the charging data records generated by the SMSC so that only charging data records concerning prepaid users will be sent to the PSMCC. In embodiments where there is no Mediation Device the PSMCC will sort the charging data records.

Although in FIG. 6, there is only one PSMCC, it is possible to have many PSMCCs. It is even possible that each of them may be dedicated to take care of charging of a particular type of message communication and/or charging in a particular kind of network, e.g. PSMCC 1 taking care of charging of message communication via circuit switched GSM and PSMCC 2 taking care of message communication via GPRS. However, they are still connected to the IN system through the same charging interface CI.

The steps described in FIGS. 2 to 5 are not in an absolutely chronological order and some of the steps can be executed simultaneously or deviating from the given order. Other functions can also be executed between the steps. Some of the steps can also be left out or performed in connection with a step in another figure. For instance, step 415 in FIG. 4 can be performed after step 507 in FIG. 5, if the new amount of money available is not bigger than zero and the subscriber is a prepaid subscriber. In some embodiments, the operation described in FIG. 3 can be performed every time when the data file has been saved. For instance, steps 301, 314, 315, and 316 can then be left out completely. In some embodiments, the charging for short messages from an intelligent network subscriber described above can only be done for prepaid subscribers. The essential in the invention is that the actual remaining amount of money available to the subscriber is updated by means of the bulk data collected for message communication charging. It is also important to make sure that the charging files which have already been processed are not processed again.

The time intervals waited before performing the functions described in FIGS. 3 and 5 need not be the same. The system should, however, preferably make sure that the buffers do not overflow because the operation in FIG. 3 is repeated at a considerably shorter time interval than that in FIG. 5.

Although in the above the invention is described using a short message service as an exemplary service, it is obvious to a person skilled in the art that the invention can be implemented with other kind of message communication, such as the USSD, or with a combination of different types of message communication.

In the above examples it is assumed that the prepaid subscription and/or the prepaid credit are valid. In the embodiments where the prepaid services are built with a prepaid expiry service having different kinds of time limits or a time limit, the expiry of credit and/or subscription bars at least the chargeable message communication services. In one embodiment of the expiry service, the prepaid subscriber who has activated his subscription is in one of the five different subscription states, the states being active, near credit expiry, credit expired, near subscription expiry and subscription expired. The state depends on how long a time has passed since the subscriber last time recharged. When the credit expires, the credit of a prepaid account is no longer valid and the subscriber can no longer send or receive message communication which is charged from him/her. When the subscription expires, the subscription is no longer valid and the subscription is deactivated and no message communication is possible. The "near states" are states during which an announcement is given indicating what is going to happen soon if the account is not recharged. The prepaid expiry service is described in greater detail in Finnish patent application FI990937 which is incorporated herein by reference.

No hardware changes are required in the structure of the intelligent network, the message communication service centre, e.g. short message service centre, or the network transmitting message communication, because the functions described above can be integrated into existing network elements. They comprise processors and memory, which can be utilized in the functions of the invention. All changes required to implement the invention can be executed as added or updated program routines in the network elements which contain functions of the invention. The short message service centre is an example of such a network element. Network elements containing data files and/or log files may also require additional memory.

It is obvious to a person skilled in the art that while technology advances, the basic idea of the invention can be implemented in many ways. The invention and its embodiments are thus not restricted to the above examples, but can vary within the scope of the claims.

The invention claimed is:

1. A method for charging intelligent network subscribers for message communication, comprising:
    maintaining account data of a subscriber in the intelligent network,
    forming a message communication charging file,
    retrieving a message communication bill of the intelligent network subscriber, and
    updating the account data of the subscriber with the message communication bill,
    wherein the message communication includes one or more messages sent from or to a mobile station without setting up an end-to-end connection.

2. A method as claimed in claim 1, wherein
    the subscriber is a subscriber using prepaid connection time, the method further comprising:
    setting a limit value for credit data,
    after an update, checking whether the account data is bigger than the limit value, and
    if the account data is smaller than the limit value, blocking the use of chargeable message communication services from the subscriber.

3. A method as claimed in claim 1, wherein the message communication bill retrieval and account data update is performed at predefined intervals.

4. A method as claimed in claim 1, wherein
    the account data of the subscriber is maintained in the intelligent network by maintaining a first set of account data on the subscriber's balance and a second set of account data on the buffer sums changing the balance, and
    the account data of the subscriber is updated in two stages.

5. A method as claimed in claim 4, wherein
    in the first stage, the account data is updated with the message communication bill by adding it to the second set of account data, and
    in the second stage, the account data is updated utilizing a charging mechanism of the intelligent network by replacing the first set of account data with the sum of the first set and the second set of account data and by initializing the second set of account data after that.

6. A method as claimed in claim 4, wherein each stage is executed at predefined intervals which need not be the same for both intervals.

7. A method as claimed in claim 1, wherein the message communication is a short message communication.

8. A telecommunication system comprising
    an intelligent network or a connection to an intelligent network,
    a network configured to provide message communication, the message communication including one or more messages sent from or to a mobile station without setting up an end-to-end connection, and
    a first system a message communication charging file,
    a memory configured to maintain the account data of the intelligent network subscriber,
    wherein the system also comprises
    a second system configured to retrieve the message communication bill of the intelligent network subscriber from the charging file, and
    an update system responsive to the second system configured to update the account data of the intelligent network subscriber with the message communication bill.

9. A telecommunication system as claimed in claim 8, wherein
the subscriber is a subscriber using prepaid connection time,
the update system is arranged to check after the update if the account data is bigger than the predefined limit value and, if the account data is not bigger than the limit value, to send information on this to the network transmitting message communication, and
the network transmitting message communication is arranged, as a response to the information, to block the transmission of chargeable short messages from said subscriber.

10. A system as claimed in claim 9, further comprising at least one mediation device configured to block the transmission of chargeable message communication from said subscriber in response to the information.

11. A system as claimed in claim 8, wherein the second system is adapted to retrieve credit data at predefined intervals.

12. A system as claimed in claim 8, wherein
the second system is arranged to request the update system to update the account data of the intelligent network subscriber, and
the update system comprises a charging interface which is arranged to update the account data of the intelligent network subscriber as a response to said request.

13. A system as claimed in claim 8, wherein the message communication is a short message communication.

14. A network element comprising a device configured to retrieve a message communication bill of an intelligent network subscriber from a message communication charging file, the message communication including one or more messages sent from or to a mobile station without setting up an end-to-end connection, the network element being configured to update account data of the intelligent network subscriber with the message communication bill.

* * * * *